Oct. 4, 1949.  H. R. LAMBORN  2,483,911
INJECTOR
Filed Sept. 11, 1945
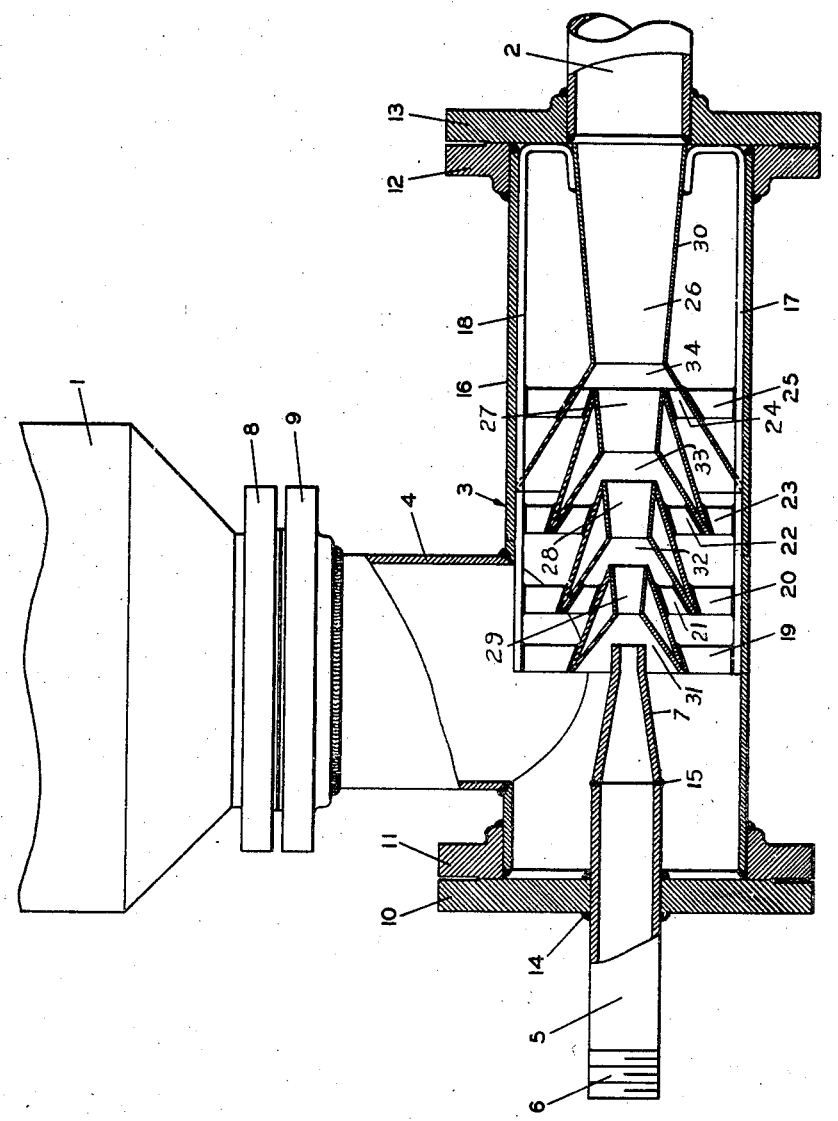
INVENTOR.
H. R. LAMBORN
BY Hudson & Young
ATTORNEYS Patented Oct. 4, 1949

2,483,911

UNITED STATES PATENT OFFICE 2,483,911

INJECTOR

Herschel R. Lamborn, Kansas City, Kans., assignor to Phillips Petroleum Company, a corporation of Delaware Application September 11, 1945, Serial No. 615,551

3 Claims. (Cl. 302—25)

This invention relates to injectors for granular materials. In a more specific aspect, it relates to conveying systems for granular or pulverulent materials in which the material is conveyed by liquid or gas under pressure. In a still more specific aspect, the invention relates to that portion of such conveying system at which the fluid under pressure picks up the granular material and conveys it into a pipe.

In the prior art, it is customary to pick up granular material from a hopper by means of a fluid jet. The jet of fluid forces the granular material into a pipe for the purpose of conveying the granular material. The granular material tends to bridge around the opening and will jam and stop the flow. Regardless of the shape of the opening, when there is only one opening this tendency to jam and bridge will cause interruptions in the operation of the system with resulting loss of time and other obvious inconveniences.

The principal object of the present invention is to provide an injector for granular material which will not stop operation and in which the granular material cannot jam or bridge to an extent of interrupting the operation of the device.

Another object is to provide means for pneumatically injecting and conveying clay whereby such objects as agitators may be loaded with clay.

Another object is to provide an injector for granular material with a plurality of inlets for the granular material.

Numerous other objects and advantages will be apparent to those skilled in the art upon reading the accompanying specification, claims and drawing.

In the drawing, the single figure is an elevational view of an injector for granular material embodying the present invention with parts in cross section and parts broken away.

In the drawing, a hopper 1 is provided for the granular material which material is to be injected into and/or conveyed through pipe 2. In order to perform this injection, an injector generally designated as 3 is provided connected to hopper 1 and pipe 2. The exact lines of demarcation between the elements 1, 2, and 3 are, of course, indefinite as hopper 1 may be considered as extending down an indefinite distance into inlet portion 4 of injector 3.

Pipe 5 is connected at 6 to a source of fluid under pressure (not shown). For some granular materials, gases are preferred as the pressure fluid; while for other materials, liquids are preferred. For clay, for example, I prefer to use compressed air as a cheap and suitable pressure fluid.

The fluid enters through pipe 5 and is directed by nozzle 7 into pipe 2 substantially along the axis of said pipe.

Parts 1, 2, 3, and 5 are connected together by any suitable means and in relatively large installations for handling clay, I prefer to use flanges 8, 9, 10, 11, 12, and 13 which may be bolted or otherwise secured together and the various elements are connected together preferably by welds such as 14 and 15. Obviously, parts may be made integral and suitable connection means substituted without departing from the present invention.

Injector 3 has an outlet portion 16 and mounted inside 16 is a frame composed of longitudinal members 17 and 18 and radial members 19, 20, 21, 22, 23, 24, and 25.

A series of relatively small Venturi tubes 26, 27, 28, and 29 are held in place by said frame. Nozzle 7 is disposed so that the restriction of said nozzle will form the intake flared portion of a relatively large Venturi tube 30, the discharge flared portions of said relatively small Venturi tubes 26, 27, 28, and 29 forming a discontinuous surface of the discharge flared portion of said relatively large Venturi tube 30. The intake flared portions 31, 32, 33, and 34 of tubes 26, 27, 28, and 29 are disposed to form guide inlets for admission of said granular material (not shown) from hopper 1 to the large venturi 30.

*Operation*

The granular material from 1 flows down through 4 and through the frame members 19, 20, 21, 22, and 23 into openings 31, 32, 33, and 34. The fluid under pressure coming through 5 is blown out the nozzle 7 and passes through outwardly flaring elements 29, 28, 27, and 26 into pipe 2 and picks up the granular material from spaces 31, 32, 33, and 34.

The granular material feeds readily through the four spaces 31, 32, 33, and 34 and will not bridge or jam in all these spaces especially as space 34 is positioned in portion 16 which is not directly under hopper 1. Not only is it unlikely that jamming should occur in all the passages at once, but the protection of the overhanging portion of 16 aids in keeping pressure down on the granular material in the passages 33 and 34 while the fact that Venturi tubes 26, 27, 28, and 29 are all connected by a frame work composed of elements 19, 20, 21, 22, 23, 24, and 25 allows vibrations to be transmitted from a venturi which is operating properly to one which has jammed, which vibrations tend to free the material in the jammed venturi.

It is not intended to limit the present invention to any theory of operation such as outlined above as it is obvious that many advantages will flow from the structure illustrated.

The granular material passing through openings 31, 32, 33, and 34 is entrained by the fluid entering through nozzle 7 and is carried into pipe 2. Pipe 2 may convey the granular material to a desired point. For example, the specific embodiment shown in the drawing has been used successfully for elevating large quantities of clay into agitators approximately fifty feet above the level of the injector.

Obviously, numerous changes in shape and proportion of parts may be made without departing from the scope of the present invention which is defined only in the following claims. For example, while contracted nozzle 7 is preferably employed because it gives better results, it is obvious that pipe 5 could operate without nozzle 7 thereon, pipe 5 having a suitable diameter, which diameter would be substantially equal to or smaller than the throat of venturi 29. Other non-inventive changes lie within the scope of the following claims.

Having described my invention, I claim:

1. Means for entraining and conveying granular material in a fluid stream, which comprises in combination a substantially L shaped pipe, the vertical portion of said L shaped pipe forming a granular material inlet; an outlet conduit in substantially horizontal alignment with the horizontal portion of said L shaped pipe extending from the end of the L shaped pipe which is remote from the vertical portion thereof; and a fluid supply conduit communicating through said horizontal section of said L shaped pipe between a fluid supply source and said outlet conduit, the portion of said fluid conduit within said horizontal portion of said L shaped pipe being formed of a series of spaced nested Venturi tubes which are disposed so that their inside downstream surfaces lie substantially in the same conical plane, whereby a series of spaces in said fluid conduit is provided between said nested Venturi tubes, said vertical portion of said L shaped pipe communicating with the interior of said fluid conduit through at least one of said spaces and a portion of said horizontal section of said L shaped pipe which is remote from said vertical portion communicating with the interior of said fluid conduit through at least one other of said spaces.

2. Means for entraining and conveying granular material in a fluid stream, which comprises in combination a substantially L shaped pipe, the vertical portion of said L shaped pipe forming a granular material inlet; an outlet conduit connected to the end of the substantially horizontal portion of said L shaped pipe which is remote from said vertical pipe portion; and a fluid supply conduit adapted to communicate at one end with a fluid supply source and extending through said horizontal portion of said pipe to communicate at its other end with said outlet, a portion of said fluid supply conduit within said horizontal portion of said L shaped pipe being formed of a series of spaced Venturi tubes, said vertical portion of said L shaped pipe communicating with the interior of said fluid conduit through at least one of said spaces between said Venturi tubes and a portion of said horizontal section of said L shaped pipe which is remote from said vertical portion communicating with the interior of said fluid conduit through at least one other of said spaces between said Venturi tubes.

3. Means for entraining and conveying granular material in a fluid stream, comprising in combination a pipe disposed to receive granular material; an outlet conduit for said entrained granular material and entraining fluid, connected to said pipe; and a fluid conduit leading from a source of fluid, extending through said pipe to connect to said outlet conduit, said fluid conduit being formed to provide therein a series of spaced Venturi tubes disposed so that their inside downstream surfaces lie substantially in the same conical plane, the interior of said pipe communicating with the interior of said fluid conduit through the series of spaces formed between said Venturi tubes.

HERSCHEL R. LAMBORN.

REFERENCES CITED

The following references are of record in the file of this patent:

UNITED STATES PATENTS

| Number | Name | Date |
|---|---|---|
| 550,244 | Blagburn | Nov. 26, 1895 |
| 827,502 | Campbell | July 31, 1906 |
| 1,028,209 | Harris | June 4, 1912 |
| 1,239,918 | Kirchhofer | Sept. 11, 1917 |
| 1,496,913 | Warford | June 10, 1924 |
| 1,856,902 | Arrowwood | May 3, 1932 |
| 1,908,220 | Chapman | May 9, 1933 |
| 1,970,405 | Thomas | Aug. 14, 1934 |

FOREIGN PATENTS

| Number | Country | Date |
|---|---|---|
| 4,757 | Great Britain | Oct. 6, 1882 |